(12) United States Patent
Koerner (10) Patent No.: US 9,621,096 B1
(45) Date of Patent: Apr. 11, 2017

(54) CURRENT RECYCLING VOICE-COIL-MOTOR (VCM) DRIVER CIRCUIT

(71) Applicant: Apple Inc., Cupertino, CA (US)

(72) Inventor: Lucas J. Koerner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 14/869,394

(22) Filed: Sep. 29, 2015

(51) Int. Cl.
*H02P 3/14* (2006.01)
*H04N 5/232* (2006.01)
*H02P 25/02* (2016.01)
*H02P 25/028* (2016.01)

(52) U.S. Cl.
CPC ............. *H02P 25/028* (2013.01); *H02P 3/14* (2013.01); *H04N 5/23258* (2013.01); *H04N 5/23287* (2013.01)

(58) Field of Classification Search
CPC ..... H02P 25/028; H02P 3/14; H04N 5/23258; H04N 5/23287
See application file for complete search history.

(56) References Cited

U.S. PATENT DOCUMENTS

| | | | |
|---|---|---|---|
| 7,495,693 B2 | 2/2009 | Uenaka | |
| 7,884,564 B2 | 2/2011 | Huang et al. | |
| 8,604,744 B2 | 12/2013 | Takai et al. | |
| 8,970,301 B2 | 3/2015 | Johnson et al. | |
| 2010/0165131 A1* | 7/2010 | Makimoto | H04N 5/23248 348/208.7 |
| 2011/0279899 A1* | 11/2011 | Motoike | H04N 5/23287 359/557 |
| 2014/0218798 A1* | 8/2014 | Suzuka | G02B 27/646 359/557 |
| 2015/0198783 A1 | 7/2015 | Shimotsu | |

* cited by examiner

*Primary Examiner* — Gevell Selby
(74) *Attorney, Agent, or Firm* — Blakely, Sokoloff, Taylor & Zafman LLP (57) ABSTRACT

A method for driving first and second voice coil motors (VCMs) by generating a first coil current through the first VCM and routing a portion (not all) of the first coil current through the second VCM when a first VCM movement command is commanding greater movement than a second VCM movement command. A second coil current is generated through the second VCM and a portion (not all) of the second coil current is routed through the first VCM, when the first VCM movement command is commanding smaller movement than the second VCM movement command. This may reduce power consumption. Other embodiments are also described and claimed.

17 Claims, 4 Drawing Sheets

CURRENT RECYCLING VOICE-COIL-MOTOR (VCM) DRIVER CIRCUIT

An embodiment of the invention relates to a driver circuit for driving two separate voice coil motors (VCMs) to move a lens of a camera along two axes, for optical image stabilization (OIS). Other embodiments are also described.

BACKGROUND

Optical image stabilization (OIS) mechanisms in compact camera modules such as those used in portable consumer electronics devices (e.g., smartphones, tablet computers) often have two separate voice coil motors (VCMs), in order to translate a lens of the camera module along two orthogonal axes that are orthogonal to the optical axis of the camera module. The displacement in these X and Y directions are proportional to the current through their respective VCM coils. These coils are typically driven by an integrated circuit that is referred to also as a VCM driver integrated circuit (IC), which is typically installed on a main substrate of the camera module. For each coil, the driver IC has a separate current source that regulates a coil current drawn from a voltage supply, where the coil current is to pass through each VCM coil (to ground.) Each of the VCM coil currents is thus typically driven separately, by a separate current source, and is controlled separately in accordance with the stroke or displacement (movement) commanded by a camera OIS controller. The camera OIS controller receives input from an inertial sensor that is also integrated in the portable device housing (along with the camera module), and tries to compensate for the movement of the housing, for example during involuntary shaking of a user's hand who is holding the portable device while taking a picture. The OIS controller computes how much to move the lens so as to compensate for the shaking, so as to stabilize the optical image of the scene that is being formed on an imaging sensor of the camera module. These computed VCM commands are sent to the VCM driver IC, which in turn translates them into coil currents $I_x$ and $I_y$ that it generates through the respective VCM coils, in order to achieve the expected movement of the lens. Such stabilization of the optical image, available during both video and still modes of camera operation, will contribute to a less blurry picture.

SUMMARY

An embodiment of the invention aims to reduce power consumption in a driver circuit for first and second VCMs, by "recycling" some of the current that is passing through the VCM coil with the higher current demand, through the other VCM coil (that has a lower current demand). In other words, rather than separately driving the two coil currents $I_x$, $I_y$ through respective current sources, an embodiment of the invention routes a portion (not all) of a first coil current $I_x$ through a second VCM (as $I_y$), when the first VCM movement command is commanding greater movement than the second VCM movement command (or equivalently, when $I_x > I_y$ because it is understood that a greater commanded VCM movement will in most instances require a greater coil current. This current recycling technique also applies when the first VCM movement command is commanding a smaller movement than the second VCM movement command. In that case, the coil current through the first VCM, $I_x$, will be smaller than the coil current through the second VCM, $I_y$, such that in that case a portion (not all) of the second coil current $I_y$ is routed through the first VCM (as $I_x$). In this manner, a portion of the current through a given coil is being recycled to drive the other coil, such that power consumption of the driver circuit is reduced.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings and, as a result, not all elements in the figure may be required for a given embodiment.

DETAILED DESCRIPTION

Several embodiments with reference to the appended drawings are now explained. Whenever aspects of the embodiments described here are not explicitly defined, the scope of the disclosure is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

Figure 1:
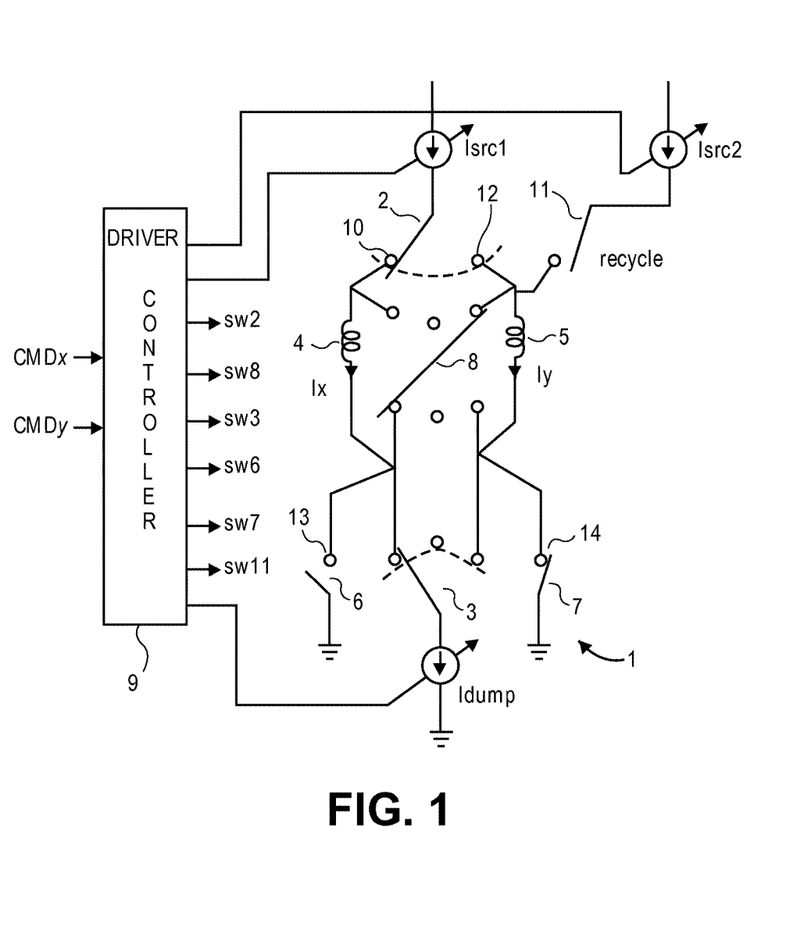
FIG. 1 is a schematic of a driver circuit for two separate voice coil motors, in accordance with an embodiment of the invention.
Figure 2:
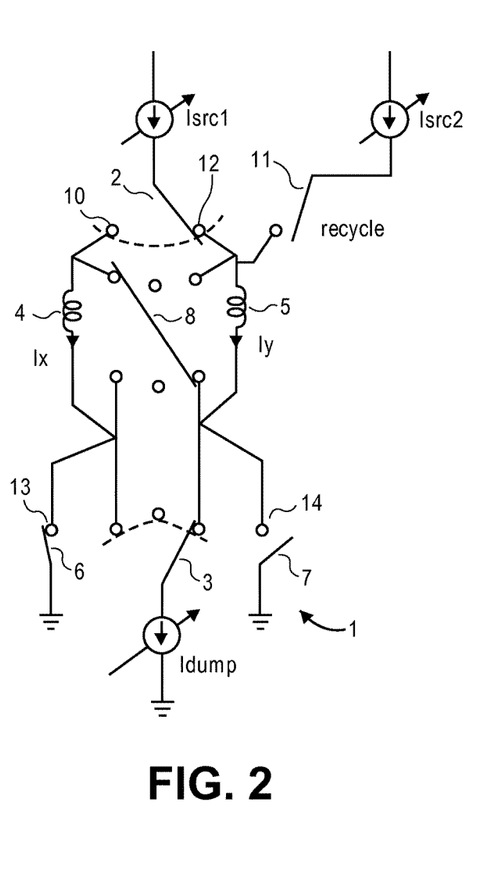
FIG. 2 is a schematic of the driver circuit of FIG. 1 as configured when the commanded first VCM movement is smaller than the commanded second VCM movement.

FIG. 1 and FIG. 2 are schematics of a driver circuit that can drive at least two separate voice coil motors (VCMs), in accordance with an embodiment of the invention. The driver circuit is for driving the coils 4, 5 of first and second VCMs, respectively. The driver circuit may be composed of an electrical current supply and switch network 1, and a controller 9 (also referred to as a driver controller 9). The current supply and switch network 1 is coupled to a first VCM node 10, a second VCM node 12, and third and fourth VCM nodes 13, 14 where it can access the respective terminals of the coils 4, 5. The first VCM node 10 is to conduct a first coil current $I_x$ through the first VCM, while the second VCM node 12 is to conduct a second coil current $I_y$ through the second VCM. The current supply and switch network 1 may have a first variable current source $I_{src1}$, and a network of solid state switches 2, 3, 6, 7, 8 that serve to route the various currents as explained below, as configured by the controller 9. It should be noted that the network of switches 2, 3, 6, 7, 8 which are described below and shown in FIGS. 1-2 is just one example of how to achieve current recycling for two VCM motors; other circuit designs for achieving the same current recycling are possible.

In this particular example, the switch 8 in one state creates a current path that joins the VCM nodes 12, 13, another state removes that path while creating another path that joins VCM nodes 10, 14 (see FIG. 2). In a further embodiment described below in connection with FIG. 3, the switch 8 has a third state in which both of those paths are removed. As to switch 2, this switch is wired such that is causes current from $I_{src1}$ to be routed to either the first VCM node 10 or the second VCM node 12. In the recycle mode of operation being described here, switch 2 thus serves to provide either the first coil current $I_x$ or alternately the second coil current $I_y$, from the same variable current source $I_{src1}$. Thus it can be seen that $I_{src1}$ is to produce, alternately, the first coil current $I_x$ and the second coil current $I_y$ (depending upon the state of the switch 2 and of course the level of current as set by the controller 9). Additional switch circuits needed to implement this embodiment of the invention are switch 6, which selectively "grounds" the VCM node 13 (or, more generally, creates a return path for the coil current $I_x$), switch 7, which selectively (on/off) grounds the VCM node 14, and switch 3 which alternately couples a variable current source $I_{dump}$ to either VCM node 13 or 14. Note that the variable dump current source $I_{dump}$ is separately controllable by the controller 9, in accordance with both $CMD_x$ and $CMD_y$ as described below, or in other words in accordance with the commanded first VCM movement and the commanded second VCM movement, as given above by the relations for each of the different scenarios of FIG. 1 and FIG. 2. This network of switches and current sources may be configured by the controller 9 as a function of the received VCM movement commands, $CMD_x$ and CMDy, which may define the displacement or stroke (movement) demanded for the respective VCMs having coils 4, 5. The commands $CMD_x$, $CMD_y$ may directly indicate the demanded levels of coil current for coils 4, 5, respectively, or the "demanded Ix" and the "demanded Iy".

Here it should be noted that, as also pointed out above, the schematics of FIG. 1 and FIG. 2 contain elements that are not needed in a particular embodiment. Viewed another way, these schematics include elements that are present in more than one embodiment of the invention. This is done in the interest of completeness as well as conciseness (to reduce the total number of figures). Thus, in the embodiment of FIG. 1, the switch 11 and a second variable current source $I_{src2}$ should be ignored as not being required during the recycle mode of operation of the driver circuit (as described below.)

The current recycling technique and in particular the arrangement depicted in FIG. 1 as an example, may be described as follows with reference to the actions taken by the controller 9 when signaling the current supply and switch network 1 and in particular the individual switches described, into certain combinations of states that result in the desired recycling effect. When a commanded first VCM movement (as defined by $CMD_x$) is greater than a commanded second VCM movement (as defined by $CMD_y$), the controller 9 responds by signaling the various switch circuits and the current source $I_{src1}$, such that $I_{src1}$ generates the first coil current $I_x$ in accordance with $CMD_x$, which is routed through coil 4. Also, a portion (not all) of $I_x$ is routed as $I_y$, through the second coil 5. This is the case in FIG. 1, because switch 2 is in its position in contact with node 10, while switch 8 is coupling nodes 12 and 13 to each other, while switch 3 is coupling node 13 to the variable current source $I_{dump}$ and switch 6 is open. Thus, it can be seen that the two coils 4, 5 are now effectively coupled in series, between node 10 and ground (through switch 7 which is closed to thereby couple node 14 to ground.) In other words, coil 4 (or coil X) is at the driver high side, while coil 5 (coil Y) is at the driver low side. The recycling is achieved because part of $I_x$ is taken or "recycled", to become $I_y$, while another part is shunted through $I_{dump}$. $I_{dump}$ is set (by the controller 9), so that the desired amount, $I_y$, remains and which is being routed through coil 5 (in accordance with the second VCM movement command, $CMD_y$). Here it is assumed that a greater commanded VCM movement will require a larger coil current. In one embodiment, each VCM movement command directly indicates the demanded level of coil current. Accordingly, when the demanded $I_x > I_y$, the configuration in FIG. 1 is formed, by the controller 9 appropriately signaling the switches 2, 3, 6, 7, 8, setting $I_{src1}$ to produce $I_x$ in accordance with $CMD_x$, and setting $I_{dump}$ in accordance with both $CMD_x$ and $CMD_y$ such that $I_y = I_x - I_{dump}$.

In other words, still referring to FIG. 1 when $I_x$ is greater than $I_y$, coil 4 and coil 5 are coupled in series, with coil 4 at the driver high side. The controller 9 sets the value of $I_{src1}$ to the higher demanded current, which in this case is $I_x$, while shunting a current $I_{dump}$ through the coil 4, away from coil 5, in an amount that is needed to provide the demanded current for coil 4 (pursuant to $CMD_y$. Thus, the value of $I_{dump}$ is given by the relation $I_{dump} = I_x - I_y$.

In practice, either coil 4 or coil 5 could demand the larger current, as indicated in the movement being commanded in $CMD_x$, $CMD_y$. The current supply and switch network 1 is able to continue recycling coil current even in the case where demanded $I_x$ is less than demanded $I_y$, by being configured into its form depicted in FIG. 2. In this configuration, the switches 2, 3, 6, 7, and 8 are set so as to couple coil 5 to the high side, while coil 5 and coil 4 are coupled in series. This is in contrast to the situation in FIG. 1 where $I_x$ was greater than $I_y$, such that coil x is coupled at the high side. Returning to FIG. 2 it can be seen that the same variable current sources $I_{src1}$ and $I_{dump}$ may be used in both configurations, so as to recycle part of the current produced by $I_{srce}$ (which is the greater current $I_y$ in the case of FIG. 2) through the coil 4 as $I_x$, while dumping the excess current through $I_{dump}$. In this case, the controller 9 will set the level of $I_{src1}$ to be the demanded current $I_y$ (pursuant to or as defined in $CMD_y$), while $I_{dump}$ is given in this case by the relation $I_{dump} = I_y - I_x$. The configuration in FIG. 2 is achieved by setting switch 2 to couple $I_{src1}$ to node 12 (instead of node 10), switch 8 to couple node 10 to node 14, switch 3 to couple $I_{dump}$ to node 14 (instead of node 13), switch 6 to close so as to ground node 13, while switch 7 is open to allow the excess current (the difference between $I_y$ and $I_x$) to be taken by $I_{dump}$.

Figure 3:
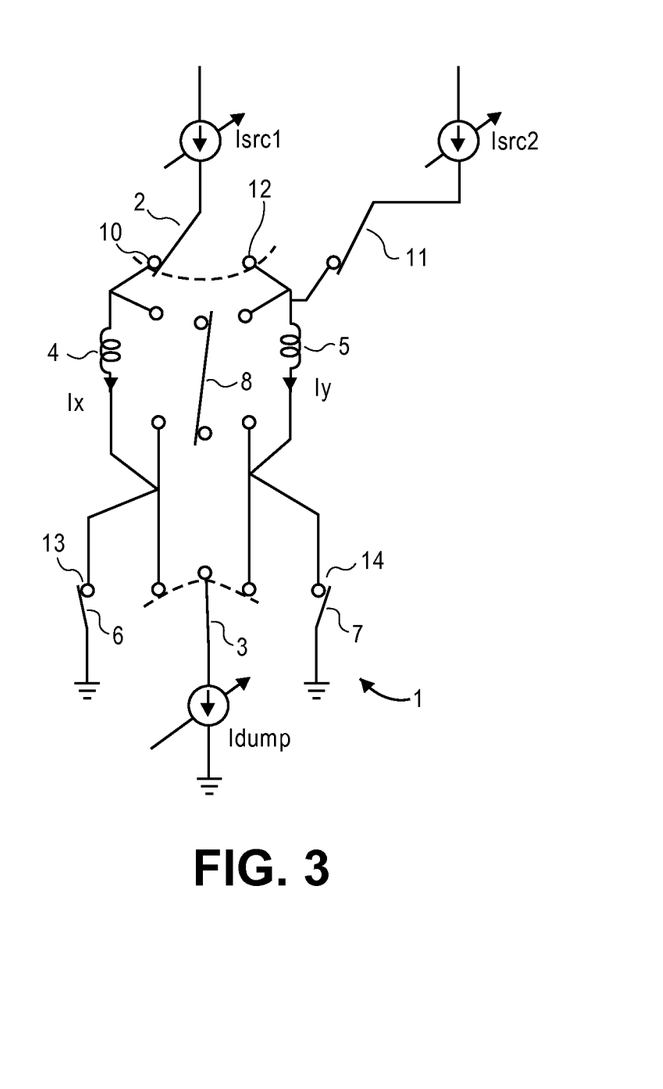
FIG. 3 is a schematic of the driver circuit of FIG. 1 as configured into an independent mode of operation (as opposed to a recycle mode of operation).

In cases where the supply voltage that is provided to $I_{src1}$ (not shown) may be limited, such as in for example a portable device having a relatively low battery voltage, there may be insufficient headroom (voltage compliance, voltage drop) across $I_{src1}$ to allow accurate production of the set current level. This may occur in situations where there is relatively large VCM movement that is being commanded, to one or both of the coils 4, 5. In such a high current situation, where the coil current $I_x$, is above a certain threshold or $I_y$ is above a certain threshold, it may be desirable to not operate the driver circuit in its recycling mode (in FIG. 1 and FIG. 2.) In accordance with another embodiment, the driver circuit may be designed to be configurable into an independent mode of operation, as depicted in FIG. 3. For instance, if $I_x+I_y>I_{threshold}$, the component stack up shown in FIG. 1 or in FIG. 2 may result in insufficient voltage drop or voltage compliance across $I_{src1}$ (in view of a limited supply voltage that is supplying $I_{src1}$ and/or the DC resistance of the coils 4, 5 being too large. In both instances, it may be desirable to reconfigure the current supply and switch network 1 into the arrangement shown in FIG. 3, where the current recycling mode is disabled such that both coils 4, 5 are now driven directly from their respective current sources $I_{src1}$, $I_{src2}$. In other words, in response to the controller 9 detecting that for example the commanded first VCM movement is greater than the second, but that the sum of the two VCM movements are also greater than a threshold, the switches 3, 6, 7, 8 are signaled into their states as depicted in FIG. 3, which results effectively in isolating the two coil circuits so that $I_x$ and $I_y$ are independently fed and controlled by their respective variable current sources $I_{src1}$, $I_{src2}$. This may yield a smaller voltage drop stack up so that sufficient compliance is ensured across the variable current sources. Since $I_{src1}$ and $I_{src2}$ are separately controllable, variable current sources, the controller signals $I_{src1}$ to generate the first coil current $I_x$ (which is routed through the VCM node 10 and the coil 4, without routing a portion of that current through the second VCM node 12 or the second coil 5), and $I_{src2}$ is signaled to generate the second coil current $I_y$ which is routed through the second VCM node 12 (and the second coil 5) without routing a portion of $I_y$ through the first VCM node 10 (or through the first coil 4). In that case, $I_{dump}$ may be inactive or a "do not care" value, because it is isolated from both coils 4, 5.

In other words, still referring to FIG. 3, in the independent mode of operation, there is a first circuit formed by the series combination of $I_{src1}$ feeding the coil 4 through the closed switch 6, and a second circuit that is running at the same time but is the series coupling of $I_{src2}$ with coil 5 and closed switch 7. It should be noted that the configuration in FIG. 3 (the independent mode of operation) may take place in two different situations as suggested above, namely one where $I_x>I_y$ and $I_y>I_{th}$, or where $I_x<I_y$ and $I_x>I_{th}$. In other words, when the commanded first VCM movement is greater than the commanded second VCM movement, and the commanded second VCM movement is greater than a threshold, then the controller configures the current supply and switch network 1 into the independent mode of operation such as depicted in FIG. 3. Similarly, when a commanded first VCM movement is smaller than the commanded second VCM movement and the commanded first VCM movement is greater than a threshold, the controller will configure the current supply and switch network 1 also into the independent mode of operation as depicted for example in FIG. 3. It can be seen therefore that the controller 9 may "dynamically" reconfigure the current supply and switch network 1 between the recycle mode of operation (depicted in FIG. 1 or FIG. 2) and the independent mode of operation (depicted in FIG. 3), while continuing to receive updated $CMD_x$ and $CMD_y$ (which it translates into demanded $I_x$ and $I_y$ levels, respectively).

Accordingly, an embodiment of the invention is a driver circuit that is able to operate in both an independent mode of operation and in a recycle mode of operation, where this may be needed due to a limited of voltage supply that is available to $I_{src1}$. Thus, in situations where voltage compliance or headroom across $I_{src1}$ is not an issue (either because of sufficiently high voltage supply that is available and/or low enough DC coil resistance through the coils 4, 5), the recycle mode of operation may be continuous, such that there may be no need for the switch 11 and the $I_{src2}$. In cases however where the recycling mode may need to be disabled due to reduced voltage compliance across $I_{src1}$, switch 11 and $I_{src2}$ should be added as shown in the figures, and the controller 9 may be provided with the automatic ability to recognize the need for changing to independent mode, e.g., by actually sensing $I_x$ and $I_y$ and then in response changing the configuration into FIG. 3.

A method for driving first and second VCMs may be described more generally, as follows (with the understanding that the operations below need not take place in the order described and may be implemented, in one example, by the various hardware elements described above in connection with FIG. 1 and FIG. 2). Operation begins with a first VCM movement command and a second VCM movement command being received (e.g. $CMD_x$, $CMD_y$ as received by the controller 9 in FIG. 1. When the first VCM movement command is commanding greater movement than the second VCM movement command, a first coil current is generated through the first VCM, and a portion (not all) of the first coil current is routed through the second VCM. Thus, taking FIG. 1 as an example, $CMD_x$ is commanding a greater movement than $CMD_y$, where such may be recognized by the controller 9 based on for example a direct comparison of the two commands or based on having translated the two commands into their respective coil current levels representing $I_x$ and $I_y$, respectively. $I_x$ is then generated through coil 4 by virtue of being coupled to $I_{src1}$ (and appropriately signaling $I_{src1}$ to produce the desired level of current), while at the same time a portion of $I_x$ is routed away as $I_y$ while "dumping" the rest of $I_x$ through the variable current source $I_{dump}$. The latter may also be appropriately signaled by the controller 9 to set the level of $I_{dump}$ in accordance with the difference $I_x-I_y$.

Subsequently, it will be the case that the first VCM movement command is commanding smaller movement than the second VCM movement command, namely that $I_x$ will be less than $I_y$. The controller 9 may become aware of such a situation, by for example comparing $CMD_x$ with $CMD_y$, which may directly indicate $I_x$, $I_y$. In that case, the method proceeds with a second coil current $I_y$ being generated through the coil 5, while a portion (not all) of $I_y$ is routed as $I_x$ (through coil 4) while the rest of $I_y$ may be dumped through the variable current source $I_{dump}$. In other words, one portion of the higher coil current continues to be routed through the other coil (which is demanding less coil current) while a remaining (or "another") portion of the higher coil current is routed elsewhere, indicated here as the dump current $I_{dump}$. The dump current may be set through a current source, based on knowledge of the expected difference between the higher and lower demanded coil currents (or the difference between the greater VCM movement command and the smaller VCM movement command). This may also be viewed as the recycle mode of operation.

In another embodiment, there may be a need to disable the recycle mode of operation described above, and instead switch to an independent mode of operation in which the first coil current is generated and routed through the first VCM without routing a portion of the first coil current through the second VCM, and at the same time generating the second coil current and routing the second coil current through the second VCM without routing a portion of the second coil current through the first VCM. This is exemplified for example by the circuit schematic of FIG. 3 in which two independent circuits are effectively formed by appropriately setting the switches 2, 3, 6, 7 and 8. As explained above, this independent mode of operation for driving the VCMs may be needed during instances where the controller 9 for example detects that the first VCM movement command is commanding greater movement than the second VCM movement command, and at the same time the second VCM movement command is commanding greater than a threshold movement. This may be viewed as the high current situation described above, during which for example the voltage drops across the DC resistances of the coils 4, 5 are excessive while the voltage supply for producing the coil currents has insufficient voltage.

The situation of limited voltage compliance or headroom across the current source that produces a coil current also occurs when the first VCM movement command is commanding smaller movement than the second VCM movement command, but, once again, the sum of the first and second VCM movement commands is greater than a threshold. That is another example of an excessive or high current situation, which may inhibit proper operation of the current source that is producing the coil current ($I_{src1}$ in FIG. 1 or FIG. 2). In those instances, the method for driving the first and second VCMs described above may revert to the independent mode approach of generating the first and second coil currents through separate, independent current sources (both of which may be supplied by the same voltage supply) while removing the current source $I_{dump}$ from the stack up (as seen in the configuration of FIG. 3, for example.)

Figure 4:
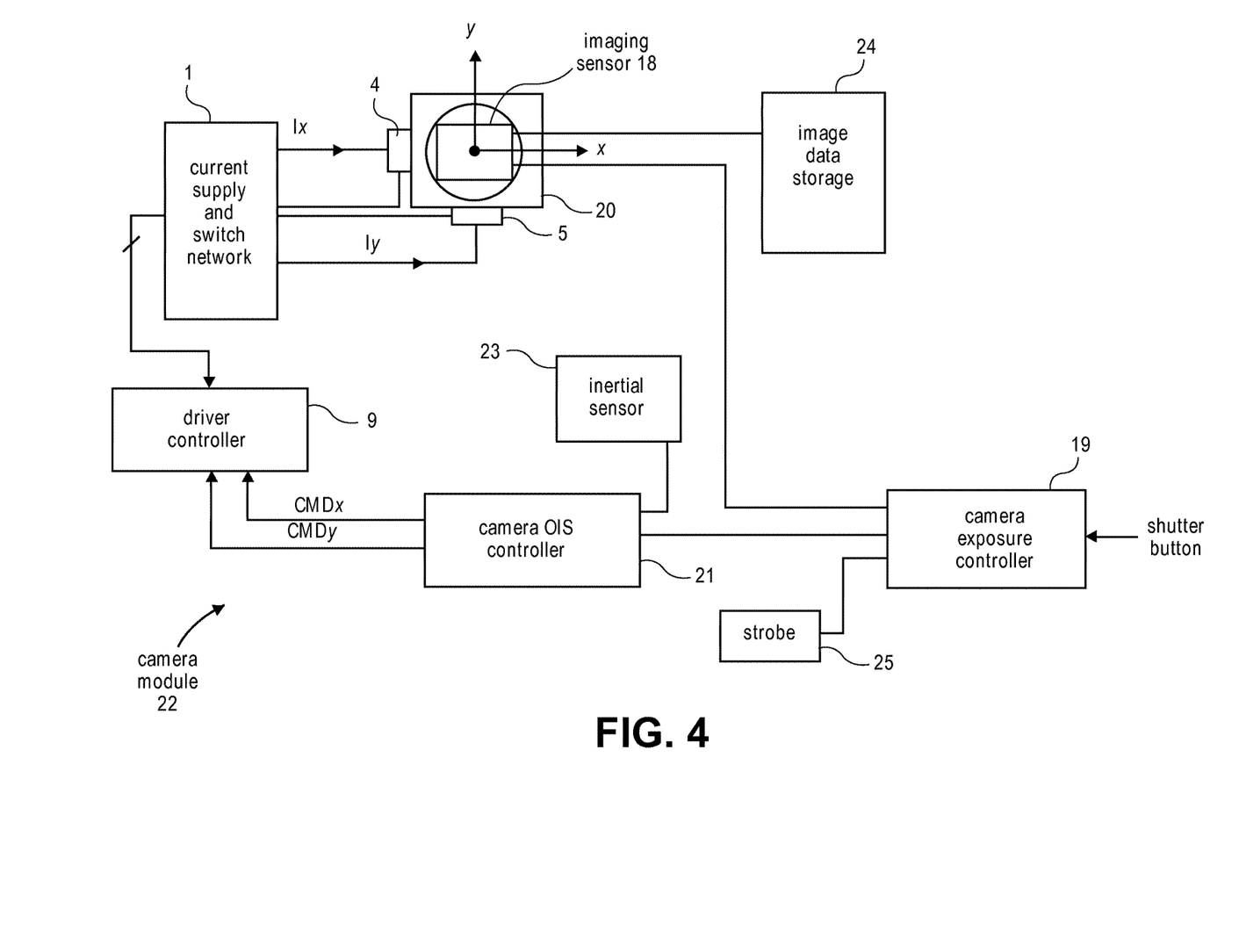
FIG. 4 is a block diagram of some components of a camera module into which an embodiment of the invention may be integrated.
Figure 5:
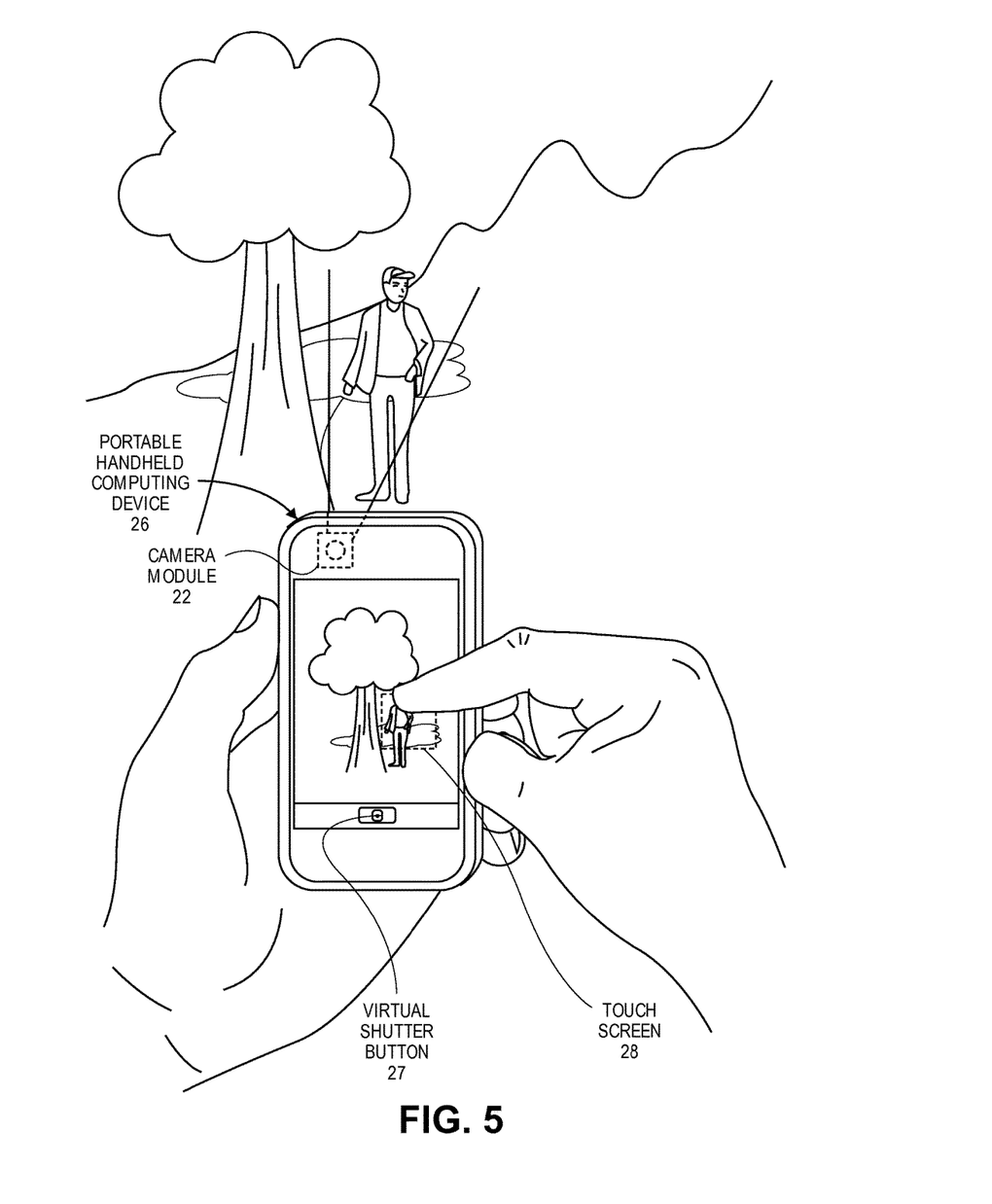
FIG. 5 depicts an example portable handheld computing device having a camera function, in which an embodiment of the invention may be implemented.

Turning now to FIG. 4, this is a block diagram of relevant components of a camera module 22, which may be integrated within a portable hand-held computing device 26, such as the one depicted in FIG. 5. The device 26 may be a smart phone or a tablet computer, just as an example. The components illustrated in FIG. 4 may be integrated within the housing of the portable handheld computing device 26, which as seen in FIG. 5 may be a smart phone or tablet computer that has an integrated touchscreen 28 to interact with its user. The user is depicted here as holding the device 26 in one hand and operating the camera functions with the other. In FIG. 4 the example camera module 22 includes an imaging sensor 18 that lies within an imaging path that also contains a multi-axis movable imaging path element 20, where the latter can change how an optical image of a scene to be captured is formed on the imaging sensor 23. Examples of the path element 20 include a lens, a mirror, or a filter. In one example, the imaging path element 20 can move in a translation type of motion in a plane, along two orthogonal directions or paths, generally referred to here as x and y. Note that in the description above where there are references to $I_x$ and $I_y$, these should be taken generically, to also refer to other coordinate systems, rather than specifically to Cartesian x-axis and y-axis which are in the same plane. As an example, the x, y references given above may refer to tilt angles (e.g., azimuthal and polar angles) in which the movement of the imaging path element 20 is not linear but curved.

The imaging path element 20 is coupled to two separate VCM actuators that are depicted here by the coil 4 and coil 5, where coil 4 is part of the first VCM which moves the imaging path element 20 in the x direction, while coil 5 is part of the second VCM that moves the path element 20 independently in the y direction. The coils 4, 5 are coupled to be driven by a driver circuit such as any one of the embodiments described above in relation to FIGS. 1-3,
composed of a current supply and switch network 1 that is configured in accordance with the demanded coil currents $I_x$, $I_y$ that it will produce and the appropriately route, to achieve the current recycling approach described above. This may be done in response to control signals generated by the driver controller 9, while the latter is translating first and second VCM movement commands $CMD_x$, $CMD_y$ that may be received from a camera OIS controller 21. The camera OIS controller 21 may be any suitable circuitry or programmed processor that performs an OIS algorithm which computes the needed stroke or displacement (movement) commands in order to move the imaging path element 20 in a way that compensates for the movement in the camera module 22, to help stabilize the optical image being formed on the imaging sensor 18. The movement of the module 22 (or the portable device in which the module 22 is integrated) may be detected using an inertial sensor 23, e.g., an accelerometer, and a gyro. The camera OIS controller 21 together with the VCM actuators (having coils 4, 5) control movement of the imaging path element 20 in order to stabilize the optical image of the scene that is being formed on the imaging sensor 18, in the presence for example unwanted motion such as due to the natural shaking of the hand of the user holding the portable hand-held computing device 26 during photography—see FIG. 5. The resulting pictures captured by the imaging sensor 23 may be saved within image data storage 24, either as still or video pictures.

Overall management of the photography process may be performed by a camera exposure controller 19, which responds to a shutter button input (e.g. activation of a virtual shutter button 27 on the touch screen 28 as seen in FIG. 5.) The exposure controller 19 computes the parameters needed to obtain quality pictures, which may also involve activating a strobe 25, or performing an auto-focus operation (the mechanism for which is not shown). As part of determining the exposure parameters needed for an acceptable quality picture, the camera exposure controller 19 may signal the camera OIS controller 21 to activate and begin the optical image stabilization process by responding to the inertial sensor 23, so that the optical image formed on the imaging sensor 23 during the upcoming capture is more stable. In such an implementation, the driver controller 9 and the current supply and switch network 1, acting as a driver circuit for the VCM actuators that are coupled to the imaging path element 20, will help reduce power consumption within the current supply and switch network 1, by recycling part of $I_x$ (into coil 4) as $I_y$ (into coil 5), in cases where $I_x > I_y$. In addition, when $I_y > I_x$, the driver controller 9 automatically changes the configuration of the current supply and switch network 1 as described above, so that a portion of $I_y$ (now the higher current) is recycled as $I_x$. To quantify this, in one embodiment of the invention, the current dissipated in the recycle mode of operation is reduced as compared to the independent mode of operation, by the amount of current through the coil with lower current demand.

The reduced power consumption noted above is especially helpful in the compact camera module 22 of FIG. 5, because it may reduce heat generation in the portable handheld device 26 thereby allowing the housing of the device 26 to feel cooler in the hands of the user, and making it cooler for the more heat sensitive components that are located close to the driver circuit.

The recycle mode may in some cases be disabled as described above, should it be necessary to do so for example to avoid a low voltage compliance situation across a current source within the current supply and switch network 1 (due to excessively high levels of $I_x$ or $I_y$). The driver controller 9 should dynamically return operation to the recycle mode when it detects that for example the demanded $I_x$ and $I_y$ have dropped below their respective thresholds, for example based on an actual measurement of $I_x$ and $I_y$ while operating in the independent mode.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIGS. 1-3 illustrate the case where Isrc1 is on the high side acting as a true current source, while Idump is on the low side acting as a true current sink, the recycling techniques described above are also valid when Isrc1 is a true current sink (into ground or other lower voltage, power supply return node) while Idump is a true current source on the high side (drawing on a positive voltage supply—not shown). That embodiment may be appreciated by turning the circuit schematics in FIGS. 1-3 upside down, and changing the direction of the arrows in the symbols for Isrc1 and Idump, while replacing the ground symbol at Idump with a positive voltage supply and adding a ground symbol to the uncoupled node of Isrc1. To complete that picture, the ground at a node of switch 7 may be replaced with a positive voltage supply node, such that Ix now changes direction and is fed as the combination of Idump and Iy (for the example of FIG. 1). That is another example of the language used in the claims to describe a portion (not all) of a coil current being routed through another coil or another VCM node.

The invention claimed is:

1. A driver circuit for first and second voice coil motors (VCMs), comprising:
   an electrical current supply and switch network coupled to a first VCM node and a second VCM node, wherein the first VCM node is to conduct a first coil current through a first VCM, and the second VCM node is to conduct a second coil current through a second VCM; and
   a controller to signal the electrical current supply and switch network to:
   a) generate the first coil current and route a portion, not all, of the first coil current through the second VCM node when a commanded first VCM movement is greater than a commanded second VCM movement, and
   b) generate the second coil current and route a portion, not all, of the second coil current through the first VCM node when the commanded first VCM movement is smaller than the commanded second VCM movement.

2. The driver circuit of claim 1 wherein the electrical current supply and switch network comprises:
   a first variable current source to alternately produce the first coil current and the second coil current.

3. The driver circuit of claim 2 further comprising:
   a variable dump current source to produce a dump current, wherein the variable dump current source is separately controllable by the controller in accordance with the commanded first VCM movement, such that when the commanded first VCM movement is greater than the commanded second VCM movement and said portion of the first coil current is to be routed through the second VCM node, another portion, not all, of the first coil current is routed as the dump current.

4. The driver circuit of claim 3 wherein the variable dump current source is separately controllable by the controller in accordance with the commanded second VCM movement, such that when the commanded first VCM movement is smaller than the commanded second VCM movement and said portion of the second coil current is to be routed through the first VCM node, another portion, not all, of the second coil current is routed as the dump current.

5. The driver circuit of claim 1 further comprising:
   a second variable current source, wherein the first and second variable current sources are separately controllable by the controller in accordance with the commanded first VCM movement and the commanded second VCM movement, and
   wherein the electrical current supply and switch network is configurable into an independent mode of operation in which:
   a) the first variable current source generates the first coil current which is routed through the first VCM node without routing a portion of the first coil current through the second VCM node, and
   b) the second variable current source generates the second coil current which is routed through the second VCM node without routing a portion of the second coil current through the first VCM node.

6. The driver circuit of claim 5 wherein when the commanded first VCM movement is greater than the commanded second VCM movement, and the sum of the commanded first and second VCM movements are greater than a threshold, the controller is to configure the electrical current supply and switch network into the independent mode of operation.

7. The driver circuit of claim 5 wherein when the commanded first VCM movement is smaller than the commanded second VCM movement, and the sum of the commanded first and second VCM movements are greater than a threshold, the controller is to configure the electrical current supply and switch network into the independent mode of operation.

8. The driver circuit of claim 1 wherein the electrical current supply and switch network is configurable into an independent mode of operation and into a recycle mode of operation,
   wherein in the independent mode of operation the first coil current is generated and routed through the first VCM node without routing a portion of the first coil current through the second VCM node, and the second coil current is generated and routed through the second VCM node without routing a portion of the second coil current through the first VCM node,
   and wherein in the recycle mode of operation
   a) a portion, not all, of the first coil current is routed through the second VCM node when the commanded first VCM movement is greater than the commanded second VCM movement and the commanded second VCM movement is smaller than a threshold, and
   b) a portion, not all, of the second coil current is routed through the first VCM node when the commanded first VCM movement is smaller than the commanded second VCM movement and the commanded first VCM movement is smaller than a threshold.

9. A method for driving first and second voice coil motors (VCMs), comprising:
   receiving a first VCM movement command and a second VCM movement command;
   generating a first coil current through a first VCM, and routing a portion, not all, of the first coil current through a second VCM when the first VCM movement command is commanding greater movement than the second VCM movement command; and generating a second coil current through the second VCM and routing a portion, not all, of the second coil current through the first VCM when the first VCM movement command is commanding smaller movement than the second VCM movement command.

10. The method of claim 9 further comprising generating a dump current in accordance with the first and second VCM movement commands, such that another portion, not all, of the generated first coil current is routed as the dump current.

11. The method of claim 9 further comprising:
   a) generating the first coil current and routing the generated first coil current through the first VCM without routing a portion of the first coil current through the second VCM; and
   b) generating the second coil current and routing the generated second coil current through the second VCM without routing a portion of the second coil current through the first VCM.

12. The method of claim 11 wherein a) and b) are performed in response to the first VCM movement command commanding greater movement than the second VCM movement command, and the sum of the first and second VCM movement commands being greater than a threshold.

13. The method of claim 11 wherein a) and b) are performed in response to the first VCM movement command commanding smaller movement than the second VCM movement command, and the sum of the first and second VCM movement commands being greater than a threshold.

14. A portable handheld computing device having a camera function, comprising:
   a portable handheld computing device housing having integrated therein
      an imaging sensor;
      a multi-axis moveable imaging path element that is to change how an optical image of a scene to be captured is formed on the imaging sensor;
      a first voice coil motor (VCM) and a second VCM coupled to the multi-axis moveable imaging path element;
      an inertial sensor;
      a camera optical image stabilization (OIS) controller having an input coupled to the inertial sensor, the camera OIS controller to produce a first VCM movement command and a second VCM movement command responsive to the inertial sensor; and
      a driver circuit coupled to drive the first and second VCMs to produce first and second commanded VCM movements in response to the first and second VCM movement commands, wherein the driver circuit is to generate:
   a) a first coil current through the first VCM and route a portion, not all, of the first coil current through the second VCM when the commanded first VCM movement is greater than the commanded second VCM movement, and
   b) a second coil current through the second VCM and route a portion, not all, of the second coil current through the first VCM when the commanded first VCM movement is smaller than the commanded second VCM movement.

15. The device of claim 14 wherein the driver circuit is to:
   a) generate the first coil current and route the generated first coil current through the first VCM without routing a portion of the first coil current through the second VCM, and
   b) generate the second coil current and route the generated second coil current through the second VCM without routing a portion of the second coil current through the first VCM.

16. The device of claim 15 wherein a) and b) are performed in response to the first VCM movement command commanding greater movement than the second VCM movement command, and the sum of the first and second VCM movement commands being greater than a threshold.

17. The device of claim 15 wherein a) and b) are performed in response to the first VCM movement command commanding smaller movement than the second VCM movement command, and the sum of the first and second VCM movement commands being greater than a threshold.

* * * * *

UNITED STATES PATENT AND TRADEMARK OFFICE
CERTIFICATE OF CORRECTION

PATENT NO.         : 9,621,096 B1
APPLICATION NO.    : 14/869394
DATED              : April 11, 2017
INVENTOR(S)        : Lucas J. Koerner Page 1 of 1

It is certified that error appears in the above-identified patent and that said Letters Patent is hereby corrected as shown below:

In the Claims

Column 10, Claim 6, Line 25, delete "the sum" and insert -- a sum --

Column 10, Claim 7, Line 32, delete "the sum" and insert -- a sum --

Column 11, Claim 12, Line 22, delete "the sum" and insert -- a sum --

Column 11, Claim 13, Line 27, delete "the sum" and insert -- a sum --

Column 12, Claim 16, Line 33, delete "the sum" and insert -- a sum --

Column 12, Claim 17, Line 38, delete "the sum" and insert -- a sum --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*